United States Patent [19]

Kotani et al.

[11] Patent Number: 4,834,658
[45] Date of Patent: May 30, 1989

[54] UNIVERSAL JOINT

[75] Inventors: Hiroshi Kotani; Susumu Serizawa, both of Osaka, Japan

[73] Assignee: Koyo Seiko Co., Ltd., Osaka, Japan

[21] Appl. No.: 221,078

[22] Filed: Jul. 19, 1988

[30] Foreign Application Priority Data

Jul. 23, 1987 [JP] Japan .......................... 62-113764[U]
Nov. 19, 1987 [JP] Japan .......................... 62-176894[U]

[51] Int. Cl.⁴ ............................................ H01R 39/02
[52] U.S. Cl. ........................................ 439/8; 464/152
[58] Field of Search ................... 464/151, 152; 439/6, 439/8, 9

[56] References Cited

U.S. PATENT DOCUMENTS 4,274,268  6/1981  Taig .............................. 464/152 X
4,317,338  3/1982  Jordan .......................... 464/152 X

FOREIGN PATENT DOCUMENTS 740562  11/1955  United Kingdom ............... 464/151

Primary Examiner—Eugene F. Desmond
Attorney, Agent, or Firm—Armstrong, Nikaido, Marmelstein, Kubovcik & Murray

[57] ABSTRACT

A universal joint including a ball joint member of synthetic resin having four ridges formed on the outer surface of a ball portion and four guide furrows formed between the ridges when the joint member is in an assembled state, and two metal yokes each having two bifurcated arms at one end, the two arms of one of the yokes being fitted in two symmetrically positioned guide furrows of the ball joint member, the two arms of the other yoke being fitted in the other two symmetrically positioned guide furrows of the ball joint member. The ball joint member is divided into a half segment toward one of the yokes and a half segment toward the other yoke, a spring member being provided in a cavity formed in the opposed faces of the half segments for biasing the half segments away from each other, an electrically conductive member being held between the two half segments and projecting into the guide furrows in pressing contact with the arms of the two yokes.

11 Claims, 7 Drawing Sheets

UNIVERSAL JOINT

BACKGROUND OF THE INVENTION

The present invention relates to universal joints, and more particularly to universal joints which are termed "ball joints" and which are suitable for use in vehicle steering mechanisms for interconnecting the input shaft and the output shaft.

Such universal joints heretofore known include those comprising two metal yokes and a ball joint member of synthetic resin interconnecting the yokes (see Unexamined Japanese Utility Model Publication SHO 59-122430). The ball joint member is divided into a half segment toward one of the yokes and another half segment toward the other yoke and has a spring for preventing the divided segments from backlashing relative to each other.

With such conventional universal joints, however, the spring is projected outward beyond the ball joint member in contact with the yokes, so that the spring or the yokes undergo marked wear, which renders the spring inoperative within a relatively short period of time, permitting backlashing. Moreover, the spring is cumbersome to install when the ball joint member is assembled.

When the universal joint is used for some vehicle steering mechanism or the like, there arises a need to pass current across the two yokes. Nevertheless, with the conventional universal joint of the type described, power is transmitted from one yoke to the other through the ball joint member of synthetic resin with the two yokes held out of direct contact with each other. Accordingly, it is impossible to pass current across the two yokes thus arranged.

SUMMARY OF THE INVENTION

An object of the present invention is to provide a universal joint which is effectively precluded from backlashing over a prolonged period of time.

Another object of the invention is to provide a universal joint comprising a ball joint member which is easy to assemble.

Still another object of the invention is to provide a universal joint comprising a ball joint member which, although made of synthetic resin, is adapted to pass current between two yokes.

The invention provides a universal joint including a ball joint member of synthetic resin having four ridges formed on the outer surface of a ball portion and four guide furrows formed between the ridges when the joint member is in an assembled state, and two metal yokes each having two bifurcated arms at one end, the two arms of one of the yokes being fitted in two symmetrically positioned guide furrows of the ball joint member, the two arms of the other yoke being fitted in the other two symmetrically positioned guide furrows of the ball joint member, the universal joint being characterized in that the ball joint member is divided into a half segment toward one of the yokes and a half segment toward the other yoke, a spring member being provided in a cavity formed in the opposed faces of the half segments for biasing the half segments away from each other, an electrically conductive member being held between the two half segments and projecting into the guide furrows in pressing contact with the arms of the two yokes.

The spring member biases the two half segments of the ball joint member away from each other into pressing contact with the respective yokes to thereby preclude backlashing. The spring member is provided in the cavity formed in the opposed faces of the two half segments combined together, has no portion projecting out beyond the ball joint member and is therefore held out of metal-to-metal contact at any portion thereof unlike the conventional spring having opposite ends in contact with the yokes. Consequently, the spring member and the yokes are less susceptible to abrasion, and the parts can be effectively prevented from backlashing over a prolonged period of time.

Furthermore, the spring member can be easily installed in place merely by fitting each end thereof into the cavity formed in the face of each half segment opposed to the other half segment. The ball joint member is therefore easy to assemble.

Moreover, electric current can be passed from one yoke to the other through the conductive member although the joint member is made of synthetic resin.

The present invention further provides a universal joint having the basic construction described above and characterized in that the ball joint member is divided into a half segment toward one of the yokes and a half segment toward the other yoke, a spring member being provided in a cavity formed in the opposed faces of the half segments for biasing the half segments away from each other, one of the yokes being fixedly provided with an electrically conductive metal member extending over the arms of the other yoke, the conductive metal member being provided at its forward end with an electrically conductive spring member of metal in pressing contact with the outer surface of the arm of the other yoke.

Electricity is transmitted from one yoke to the other yoke through the conductive metal member and the conductive spring member.

DESCRIPTION OF THE PREFERRED EMBODIMENTS

The present invention will be described below in greater detail with reference to the accompanying drawings.

Figure 1:
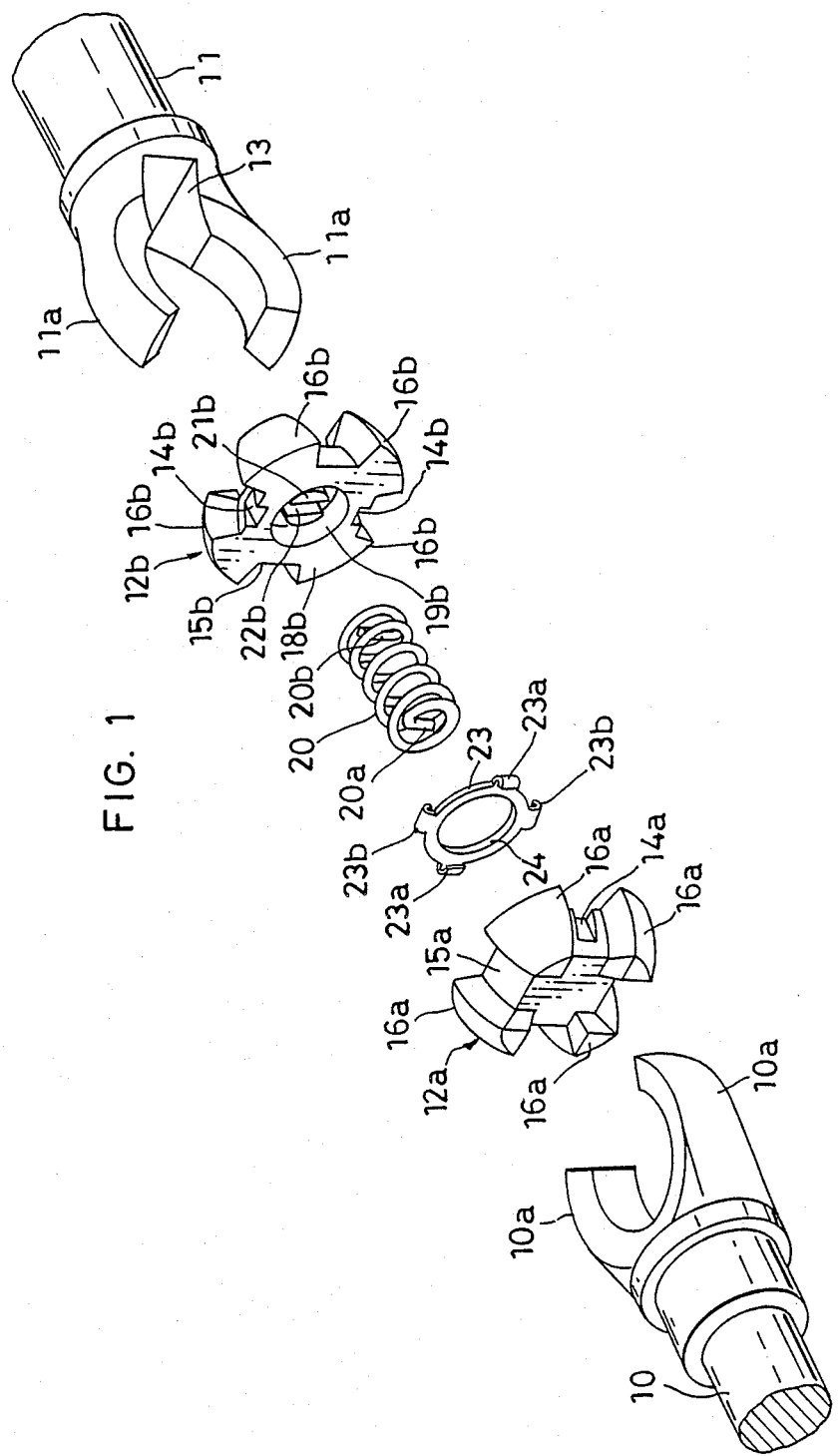
FIG. 1 is an exploded perspective view showing a first embodiment of universal joint of the invention.
Figure 2:
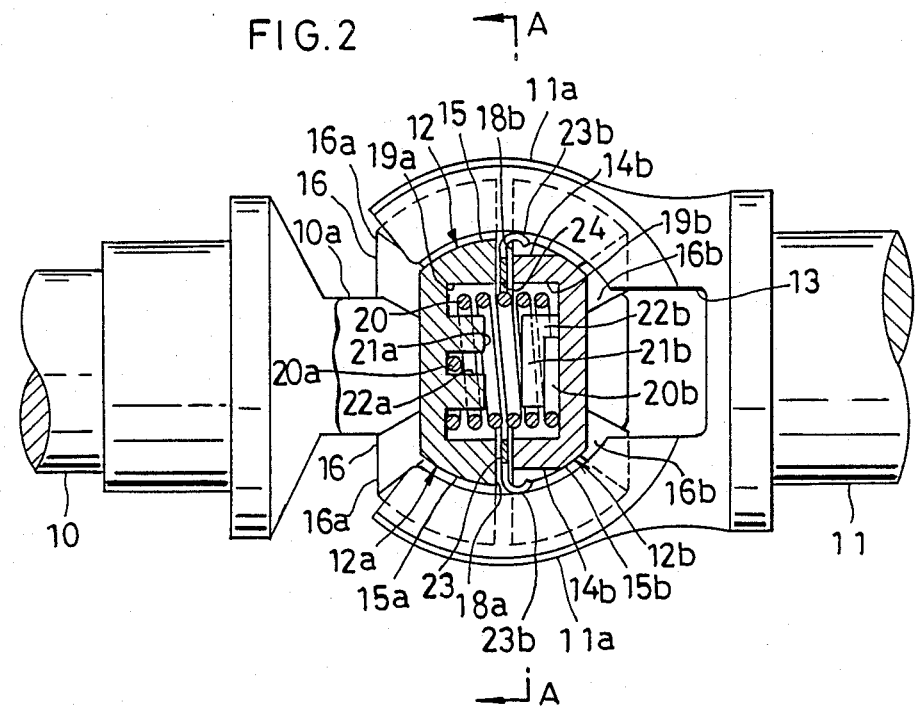
FIG. 2 is a side elevation partly broken away and showing the same as assembled.
Figure 3:
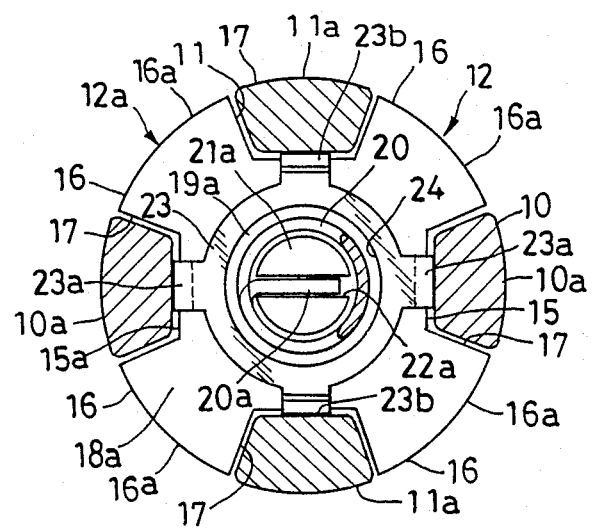
FIG. 3 is a view in section taken along the line A—A in FIG. 2.

FIGS. 1 to 3 show a first embodiment.

The illustrated universal joint comprises two metal yokes 10, 11, and a ball joint member 12 made of synthetic resin and interconnecting the yokes.

Each yoke 10 (11) has bifurcated arms 10a (11a) at its forward end. The two arms 10a (11a) of the yoke 10 (11) are trapezoidal in cross section and are combined in a U-shape resembling a circle which is partly cut away. The two arms 10a (11a) have inwardly opposed faces which, in combination, are in the form of a portion of cylindrical surface. The opposed faces may be in the form of a portion of spherical surface. The bottom faces of the four guide furrows 17 to be described later are shaped in conformity with the form of the inwardly opposed faces of the arms 10a, 11a. The second yoke 11 is formed between the two arms 11a thereof with a recess 13 for the arm 10a of the first yoke 10 to pass therethrough, for example, during assembling.

The ball joint member 12, when assembled, comprises a ball portion 15 having four ridges 16 formed on its outer surface and equidistantly spaced apart circumferentially thereof. These ridges 16 define four guide furrows 17 therebetween.

The joint member 12 in its entirety is divided into a first joint member half segment 12a toward the first yoke 10 and a second joint member half segment 12b toward the second yoke 11. The first half segment 12a comprises a first half portion 15a obtained by dividing the ball portion 15 into two equal parts and having first halves 16a of the four ridges 16 integrally formed on its outer surface. The second half segment 12b comprises the other half of the ball portion 15, i.e. a second half portion 15b, having second halves 16b of the four ridges 16 integrally formed on its outer surface. The two half segments 12a, 12b are combined together into a generally spherical shape with their approximately cross-shaped divided faces 18a, 18b opposed to each other to provide the joint member 12.

Circular cavities 19a, 19b are formed in the respective opposed faces 18a, 18b of the joint member half segments 12a, 12b. A coiled compression spring 20 is provided in the cavities 19a, 19b for biasing the two half segments 12a, 12b away from each other. The spring 20 has at its respective ends bent portions 20a, 20b each bent inwardly of a circle. The cavities 19a, 19b in the half segments 12a, 12b are formed on their bottoms with circular projections 21a, 21b, respectively. Diametrical grooves 22a, 22b are formed in the projections 21a, 21b, respectively. The ends of the spring 20 are fitted around the respective projections 21a, 21b in the cavities 19a, 19b, with the spring bent portions 20a, 20b fitted in the respective grooves 22a, 22b in the projections 21a, 21b, whereby the ends of the spring 20 are secured to the respective half segments 12a, 12b of the joint member 12.

An electrically conductive metal member 23 is held between the combination or opposed faces 18a, 18b of the two half segments 12a, 12b around the spring 20. The conductive member 23 is made of a generally circular metal plate and has an aperture 24 centrally thereof for inserting the spring 20 therethrough. The conductive member 23 has four contact portions 23a, 23b integral with its outer periphery, equidistantly spaced apart circumferentially thereof and projecting into the four guide furrows 17. The first two contact portions 23a, which are symmetrically positioned, are bent toward the first joint member half segment 12a. The other portions, i.e. the second two contact portions 23b, which are symmetrically positioned, are bent toward the second half segment 12b. Two grooves 14a for the first contact portions 23a to fit in are symmetrically formed in the outer surface of the first half portion 15a, and two grooves 14b for the second contact portions 23b to fit in are symmetrically formed in the outer surface of the second half portion 15b.

The two arms 10a of the first yoke 10 are fitted in the two guide furrows 17 of the joint member 12 which are positioned symmetrically, while the two arms 11a of the second yoke 11 are fitted in the other two guide furrows 17 of the member 12 which are positioned symmetrically. The first contact portions 23a of the conductive member 23 are resiliently in pressing contact with the inner faces of the arms 10a of the first yoke 10, and the second contact portions 23b with the inner faces of the arms 11a of the second yoke 11. The rotation of the first yoke 10 is delivered to the second yoke 11 through the joint member 12. Since the two joint member half segments 12a, 12b are biased away from each other by the spring 20 at this time, an axial pre-load acts between the half segments and the yoke arms 10a, 11a to preclude backlashing. With the present embodiment, the bent portions 20a, 20b of the spring 20 are suitably angularly displaced from the respective grooves 22a, 22b in the projections 21a, 21b, whereby torsion is given to the two half segments 12a, 12b relative to each other to preclude backlashing circumferentially thereof. Electricity is transmitted from the arms 10a of the first yoke 10 through the first contact portions 23a to the conductive member 23 and further through the second contact portions 23b to the second yoke 11.

Figure 4:
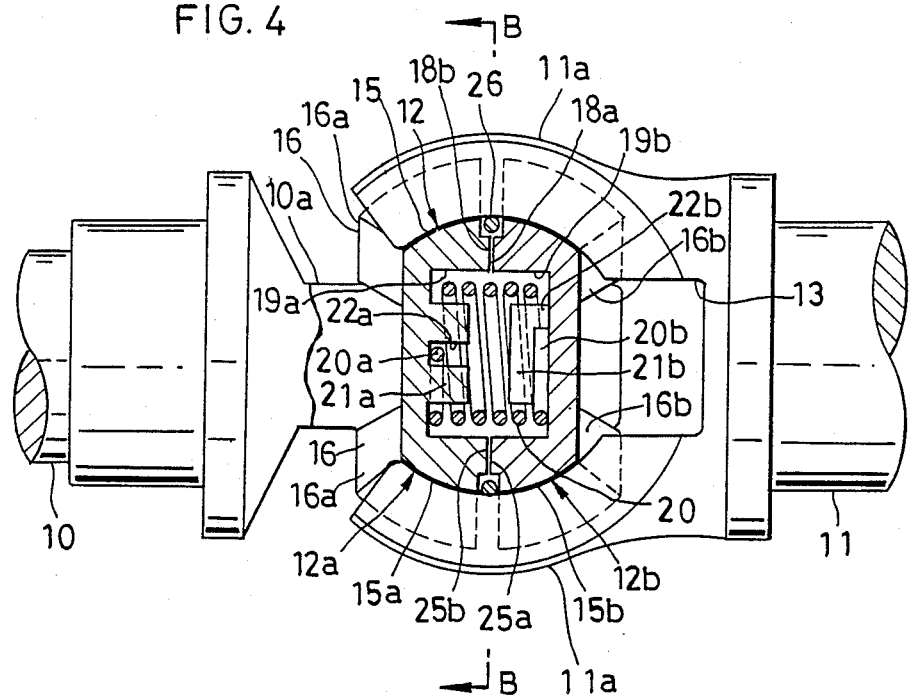
FIG. 4 is a side elevation partly broken away and showing a second embodiment of universal joint of the invention as assembled.
Figure 5:
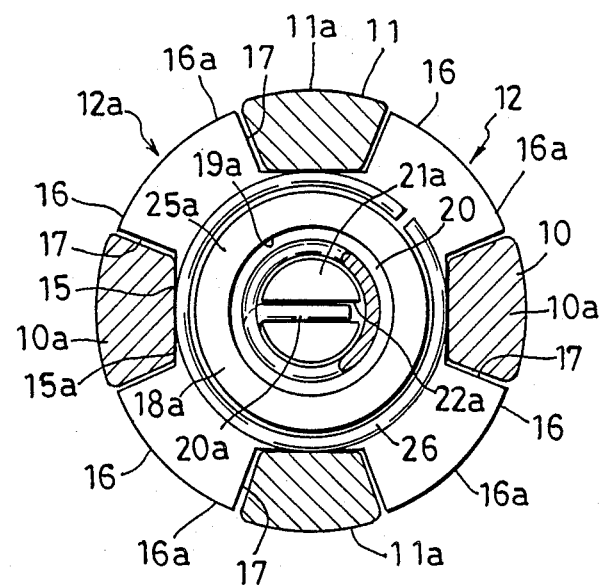
FIG. 5 is a view in section taken along the line B—B in FIG. 4.

FIGS. 4 and 5 show a second embodiment. The two half ball portions 15a, 15b of the second embodiment have circular projections 25a, 25b of small height on their opposed faces except at their outer peripheral portions, and the end faces of these projections 25a, 25b provide combination faces 18a, 18b. An electrically conductive resilient member 26 prepared by bending a slender metal bar into a circular form is provided around the projections 25a, 25b of the joint member half segments 12a, 12b assembled. The conductive member 26 is held in pressing contact with the inner faces of the arms 10a, 10b of the two yokes 10, 11 by virtue of its own resiliency, whereby electricity is transmitted from one of the yokes 10, 11 to the other yoke.

The second embodiment has the same construction as the first with the exception of the above feature; like parts are designated by like reference numerals or symbols throughout the drawings concerned.

Figure 6:
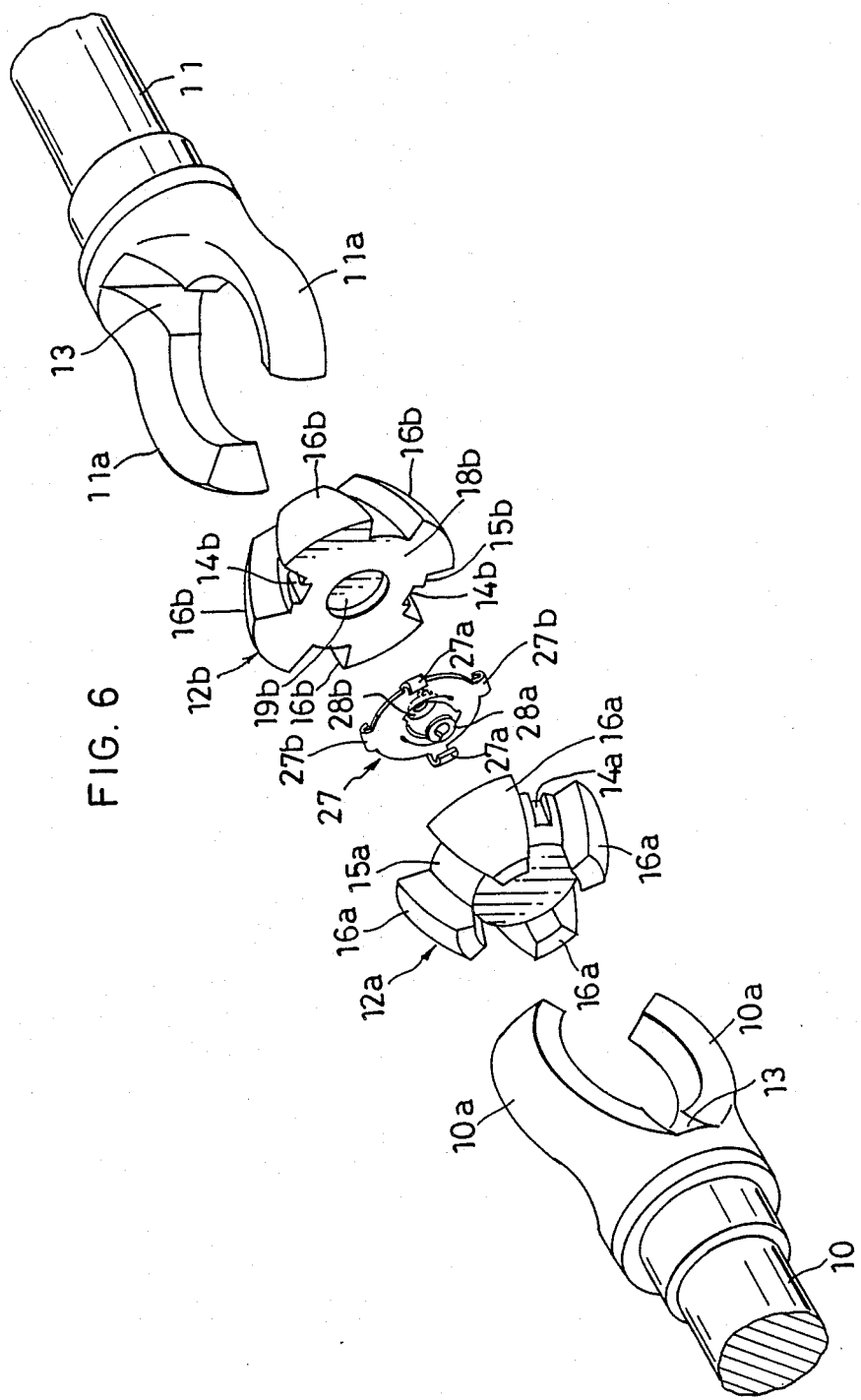
FIG. 6 is an exploded perspective view showing a third embodiment of universal joint of the invention.
Figure 7:
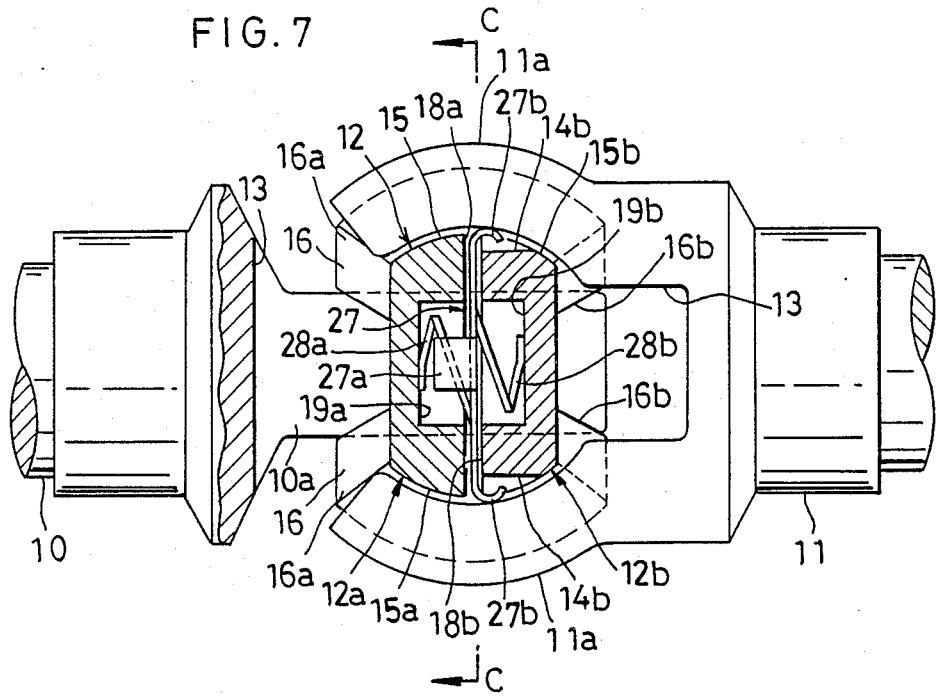
FIG. 7 is a side elevation partly broken away and showing the same as assembled.
Figure 8:
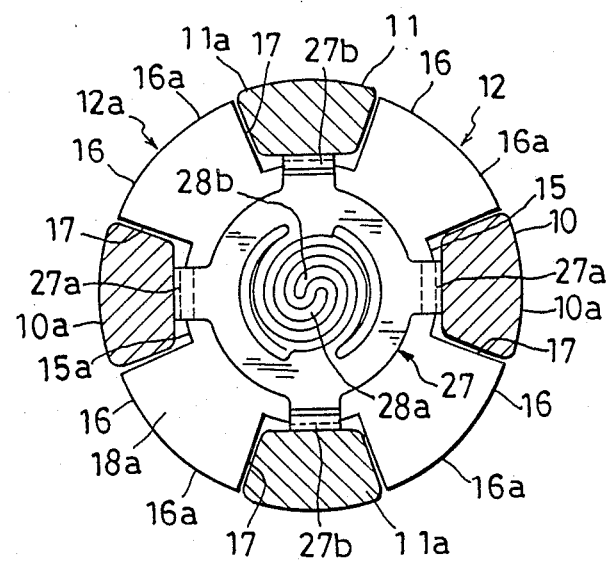
FIG. 8 is a view in section taken along the line C—C in FIG. 7.

FIGS. 6 to 8 show a third embodiment.

In the case of the third embodiment, the projections 21a, 21b are not provided at the bottoms of the cavities 19a, 19b in the opposed faces 18a, 18b of the two joint member half segments 12a, 12b. Interposed between the two combination or opposed faces 18a, 18b is an electrically conductive member 27 of metal similar to the conductive member 23 of the first embodiment.

The conductive member 27 is centrally formed with coiled spring members 28a, 28b integral therewith and projecting from the respective sides thereof. The first spring member 28a is fitted in the cavity 19a of the first joint member half segment 12a in pressing contact with its bottom, and the second spring member 28b is fitted in the cavity 19b of the second half segment 12b in pressing contact with its bottom. These two spring members 28a, 28b bias the two joint member half segments 12a, 12b away from each other. As in the first embodiment, the conductive member 27 is integrally formed on its outer periphery with four contact portions 27a, 27b equidistantly spaced apart circumferentially thereof, projecting into the respective four guide furrows 17 and held in pressing contact with the inner faces of the respective arms 10a, 11a of the yokes 10, 11.

The third embodiment has the same construction as the first with the exception of the above feature; throughout the drawings concerned, like parts are designated by like reference numerals or symbols.

Figure 9:
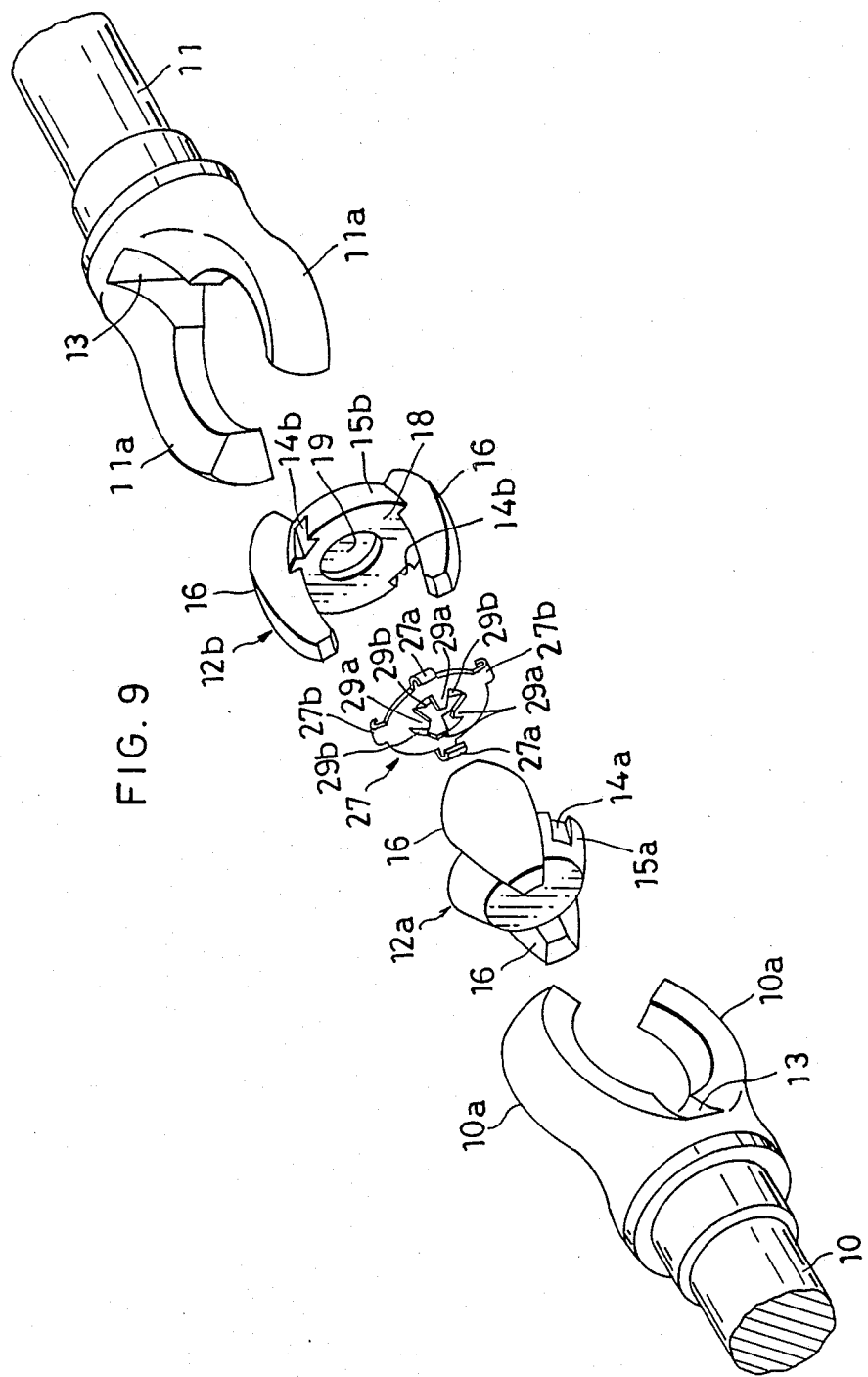
FIG. 9 is an exploded perspective view showing a fourth embodiment of universal joint of the invention.

FIG. 9 shows a fourth embodiment. The first joint member half segment 12a of this embodiment comprises a first half ball portion 15a and two ridges 16 symmetrically formed on the outer surfaces of the portion 15a integrally therewith and extending over the outer surface of a second half ball portion 15b. The second joint member half segment 12b comprises the second half ball portion 15b and two ridges 16 symmetrically formed on the outer surface of the portion 15b integrally therewith and extending over the outer surface of the first half ball portion 15a. The half segments 12a, 12b have faces 18 opposed to each other for combination and formed with cavities 19, 19, respectively, which are the same as those 19a, 19b of the third embodiment. The joint includes an electrically conductive member 27 which is centrally formed, instead of the coiled spring members 28a, 28b of the third embodiment, with first platelike spring members 29a projecting from one side thereof and with second platelike spring members 29b projecting from the other side thereof. The spring members 29a, 29b are integral with the conductive member 27 and arranged alternately.

Utilizing the elastic deformation of the synthetic resin forming the ridges 16, the two joint member half segments 12a, 12b are combined together with the conductive member 27 held between the opposed faces 18. The spring members 29a, 29b on the conductive member 27 are fitted in cavities 19 in the two segments 12a, 12b in pressing contact with the bottoms of the cavities to bias the segments 12a, 12b away from each other.

The fourth embodiment has the same construction as the third with the exception of the above feature; throughout the drawings concerned, like parts are designated by like reference numerals or symbols.

Figure 10:
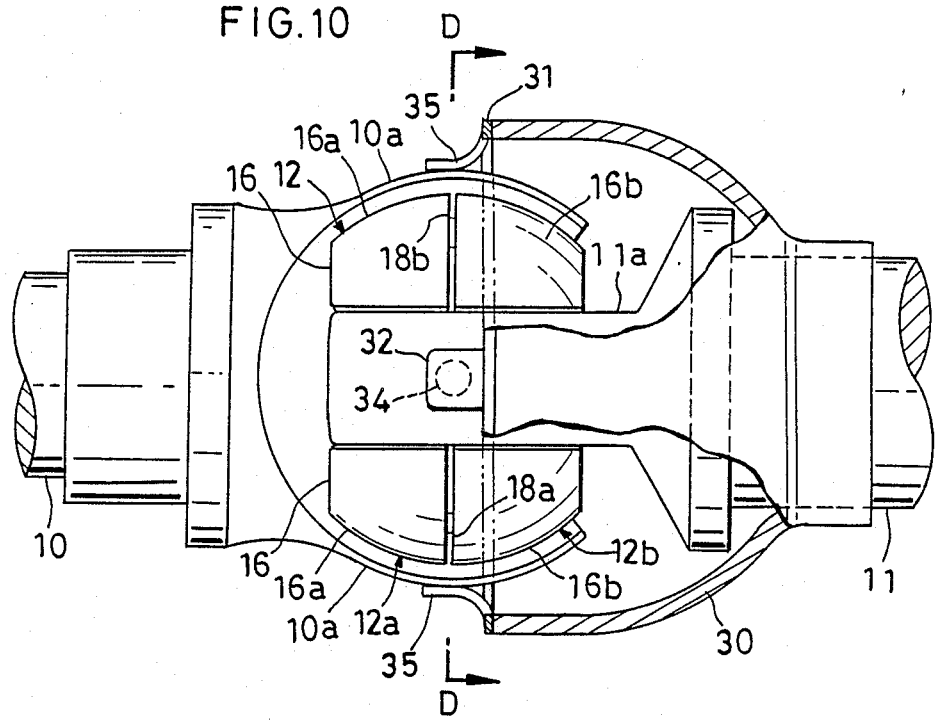
FIG. 10 is a side elevation partly broken away and showing a fifth embodiment of universal joint of the invention as assembled.
Figure 11:
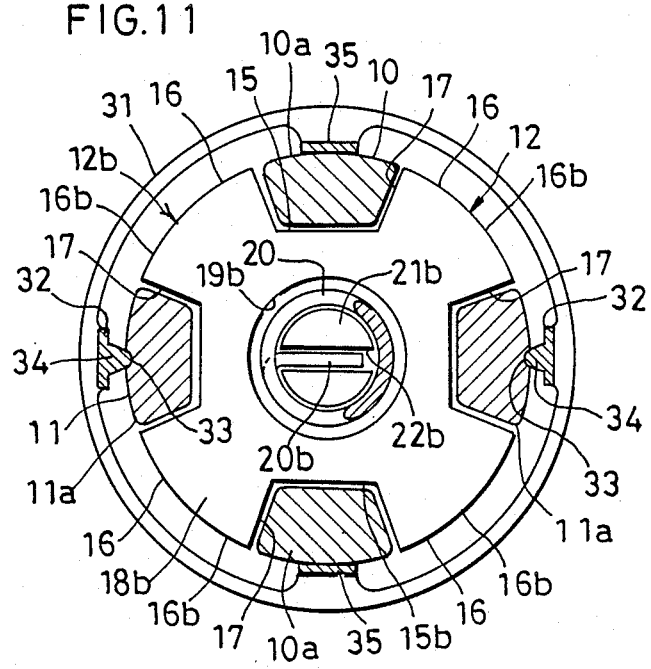
FIG. 11 is a view in section taken along the line D—D in FIG. 10.

FIGS. 10 and 11 show a fifth embodiment. With this embodiment, a cuplike electrically conductive metal cover 30 extends over a second joint member half segment 12b as combined with a first one 12a and is secured at its base end to the second yoke 11. An electrically conductive metal ring 31 concentric with the yoke 11 is secured to the forward end of the cover 30. The ring 31 is symmetrically provided with two support portions 32 each carrying a pivot 34, which is fitted in a conical socket 33 formed in the outer surface of the arm 11a of the second yoke 11. The ring 31 is further symmetrically provided with two electrically conductive plate springs 35 of metal positioned between the pivots 34 and held in pressing contact with the outer surfaces of the respective arms 10a of the first yoke 10. The two pivots 34 are positioned on the axis of rotation of the first yoke 10 relative to the assembled joint member 12. The two plate springs 35 are positioned on the axis of rotation of the second yoke 11 relative to the joint member 12. Consequently, even when the two yokes 10, 11 rotate relative to the joint member 12, the plate springs 35 are invariably in pressing contact with the respective arms 10a of the first yoke 10, whereby electricity is transmitted from the second yoke 11 to the first yoke 10 through the cover 30 and the plate springs 35.

The fifth embodiment has the same construction as the first with the exception of the above feature; like parts are designated by like reference numerals or symbols throughout the drawings concerned.

The combination of the joint member half segments with the spring member and the conductive member is not limited to those of the foregoing embodiment. For example, the half segments 12a, 12b of the third embodiment may be used in combination with the conductive member 27 of the fourth embodiment, or the half segments 12a, 12b of the fourth embodiment can be in combination with the conductive member 27 of the third embodiment. Furthermore, the yokes, joint member, spring member and conductive member are not limited to those of the foregoing embodiments in construction.

What is claimed is:

1. A universal joint including a ball joint member of synthetic resin having four ridges formed on the outer surface of a ball portion and four guide furrows formed between the ridges when the joint member is in an assembled state, and two metal yokes each having two bifurcated arms at one end, the two arms of one of the yokes being fitted in two symmetrically positioned guide furrows of the ball joint member, the two arms of the other yoke being fitted in the other two symmetrically positioned guide furrows of the ball joint member, the universal joint being characterized in that the ball joint member is divided into a half segment toward one of the yokes and a half segment toward the other yoke, a spring member being provided in a cavity formed in the opposed faces of the half segments for biasing the half segments away from each other, an electrically conductive member being held between the two half segments and projecting into the guide furrows in pressing contact with the arms of the two yokes.

2. A universal joint as defined in claim 1 wherein the spring member is a coiled spring having opposite bent ends positionable inside a circle, and the cavity in each half segment of the ball joint member is provided at its bottom with a groove for the bent end of the coiled spring to fit in and with a projection fitting in the circular end portion of the coiled spring.

3. A universal joint as defined in claim 1 or 2 wherein the conductive member comprises a generally circular metal plate having an aperture centrally thereof for the spring member to extend therethrough and contact portions integral with its periphery, projecting from between the two half segments of the joint member into the respective guide furrows and held in pressing contact with the respective arms of the two yokes.

4. A universal joint as defined in claim 1 or 2 wherein the conductive member is a metal bar bent into a circular form, is held between the outer peripheral portions of the two half segments of the ball joint member and is in pressing contact with the arms of the two yokes by virtue of its own resiliency.

5. A universal joint as defined in claim 1 wherein the conductive member comprises a generally circular metal plate centrally formed with a spring member integral therewith and projecting from each side thereof, the metal plate having contact portions integral with its periphery, projecting from between the two half segments of the joint member into the respective guide furrows and held in pressing contact with the respective arms of the two yokes.

6. A universal joint as defined in claim 5 wherein the spring member is in the form of a coil.

7. A universal joint as defined in claim 5 wherein the spring member is in the form of a plate.

8. A universal joint including a ball joint member of synthetic resin having four ridges formed on the outer surface of a ball portion and four guide furrows formed between the ridges when the joint member is in an assembled state, and two metal yokes each having two bifurcated arms at one end, the two arms of one of the yokes being fitted in two symmetrically positioned guide furrows of the ball joint member, the two arms of the other yoke being fitted in the other two symmetrically positioned guide furrows of the ball joint member, the universal joint being characterized in that the ball joint member is divided into a half segment toward one of the yokes and a half segment toward the other yoke, a spring member being provided in a cavity formed in the opposed faces of the half segments for biasing the half segments away from each other, one of the yokes being fixedly provided with an electrically conductive metal member extending over the arms of the other yoke, the conductive metal member being provided at its forward end with an electrically conductive spring element of metal in pressing contact with the outer surface of the arm of the other yoke.

9. A universal joint as defined in claim 8 wherein the spring member is a coiled spring having opposite bent ends positionable inside a circle, and the cavity in each half segment of the ball joint member is provided at its bottom with a groove for the bent end of the coiled spring to fit in and with a projection fitting in the circular end portion of the coiled spring.

10. A universal joint as defined in claim 8 or 9 wherein the conductive spring element is provided at each of two symmetrical positions on the axis of rotation of said one yoke relative to the ball joint member.

11. A universal joint as defined in claim 10 wherein the conductive metal member is provided at its forward end with a pivot positioned at each of two symmetric locations on the axis of rotation of said other yoke relative to the ball joint member and fitted in a conical socket formed in the outer surface of the arm of said one yoke.

* * * * *